Jan. 3, 1967 C. R. A. JOHNSON 3,296,623
SELF-CATCHING PIVOT PEN
Filed June 10, 1965
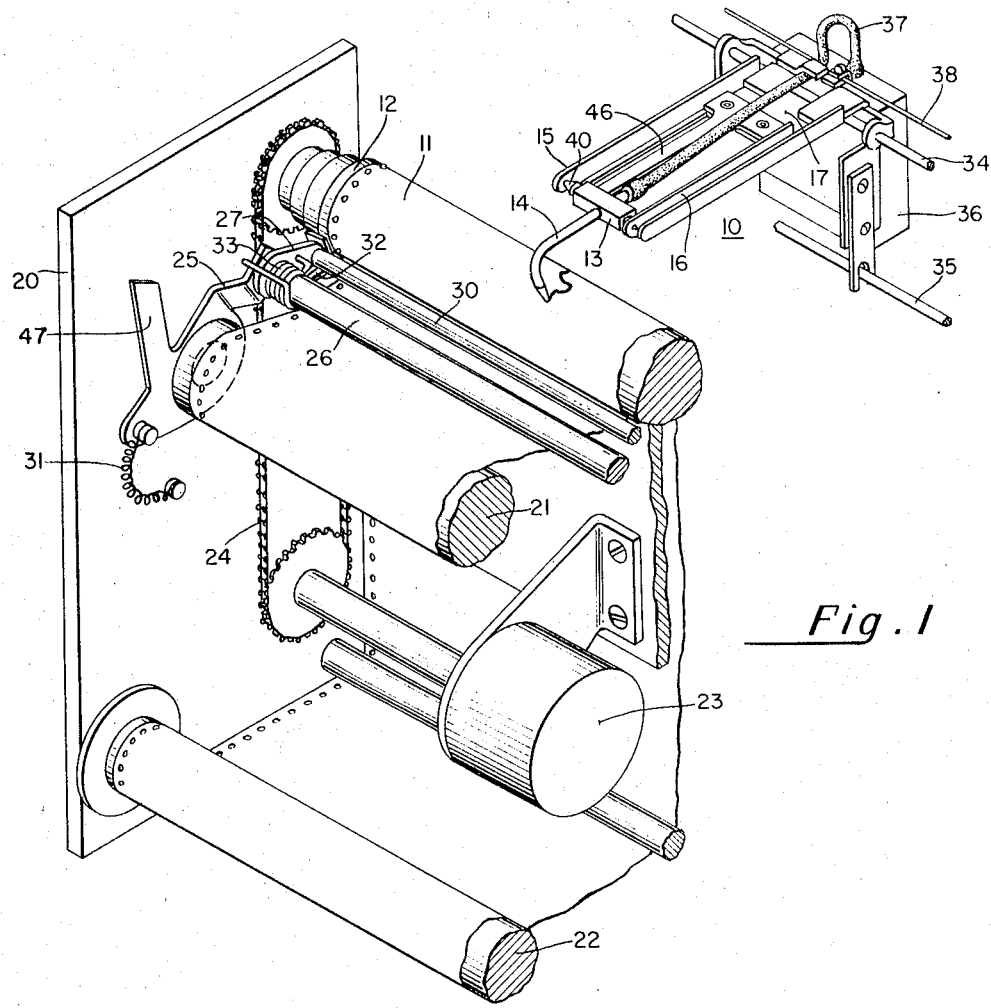
*Fig. 1*
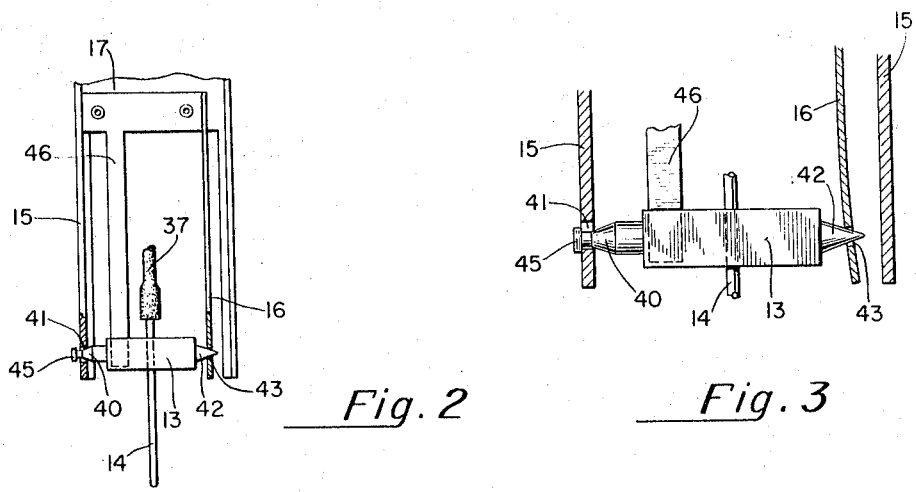
*Fig. 2*  *Fig. 3*

3,296,623
SELF-CATCHING PIVOT PEN
Curtis R. A. Johnson, Flourtown Pa., assignor to Leeds & Northrup Company, Philadelphia, Pa., a corporation of Pennsylvania
Filed June 10, 1965, Ser. No. 462,951
4 Claims. (Cl. 346—139)

This invention relates to improvements in the capillary pen support member employed in the marking assembly of strip-chart recorders generally of the type disclosed in U.S. Patent No. 3,071,772 issued January 1, 1963 wherein a marking assembly is employed in conjunction with a strip chart to indicate and record the magnitude of conditions under measurement.

In recorders of the instant type presently in use, the capillary pen supporting member can be accidently disengaged from the marker assembly either during servicing of the recorder or due to the frictional engagement of the capillary pen with the chart paper during recording operation.

Accordingly, it is an object of this invention to provide a capillary pen support member which will resist accidental dislodgement from its carrier member when a force is exerted against the support member in any direction other than in an axial direction of the support member.

In carrying out the present invention in one form, a capillary pen support member is utilized which has one end thereof suitably journaled in a flexible support arm of a carrier member and the other end thereof journaled in a rigid support arm of the carrier member by means of a frusto-conical end bearing surface positioned in an aperture in the rigid support arm. A disc-like flange is secured to the frusto-conical end bearing surface on the opposite side of the rigid support arm than the support member and will catch the side of the rigid support arm and thus prevent the capillary pen support member from being withdrawn from the rigid support arm except when the capillary pen support member is moved in an axial direction away from the rigid support arm.

For other objects and advantages of the invention and for detailed descriptions of other and useful novel features thereof, reference is to be had to the following description taken in conjunction with the accompanying drawings in which:

FIG. 1 is an isometric view partly in section of a strip-chart recorder including a marker assembly, drive roll, supply roll, take-up roll and paper detour system;

FIG. 2 is a plan view of a part of the marker assembly according to this invention shown in a normal state; and FIG. 3 is an enlarged plan view of a part of the marker assembly according to this invention shown in an offset position.

Referring now to FIG. 1, a marker assembly 10 is shown in recording position on chart paper 11 positioned over drive roll 12 and for the purpose of clarity of illustration has been shown rotated 180 degrees out of its normal position. The marker assembly 10 includes a capillary pen support member 13 and associated capillary pen 14 journaled between a rigid support arm 15 and a flexible support arm 16 of a carrier member 17 together with a capillary pen biasing spring 46, an ink reservoir 36 and a capillary tube 37. The marker assembly 10 is supported in operating position by a stationary rod 34 and a marker assembly lifter rod 35. The entire assembly is moved along these rods by a drive cord 38 which is driven by a balancing motor not shown, the supporting rods, driving motor and associated measuring system not forming a part of this invention.

Referring now to FIG. 2, the capillary pen support member 13 is shown in its normal operating position journaled between the rigid support arm 15 and the flexible support arm 16 by means of a frusto-conical bearing surface 40 on one end thereof positioned in aperture 41 in the rigid support arm 15 and a conical bearing surface 42 on the other end thereof positioned in an aperture 43 in the flexible support arm 16. A disc-like flange 45 projects from the minor diameter of the frusto-conical bearing surface 40 and is of small enough diameter to pass through the aperture 41 when the capillary pen support member is first positioned between the rigid support arm 15 and the flexible support arm 16.

Thus, to insert or position the capillary pen support member 13 between the rigid and flexible support arms, it is only necessary to deflect the flexible support arm 16 a sufficient amount so that the disc-like flange 45 may be passed through the aperture 41 whereupon the spring tension of the flexible support arm 16 will maintain the capillary pen support member in position.

To remove the capillary pen support member from the carrier member, a force need only be asserted on the support member 13 in the axial direction therefrom away from the rigid support arm 15 thus allowing the disc-like flange 45 to pass uninhibited through the aperture 41.

During operation of the recorder or even during servicing thereof, any force on the capillary pen support member 13 or its associated capillary pen 14 in a direction toward the flexible support arm 16 other than in an axial direction of the capillary pen support member 13 will cause a couple which attempts to rotate the capillary pen support member in the aperture 41 and 43.

If this force is of sufficient magnitude to deflect the flexible support arm 16, the consequent deflection, together with the aforementioned coupling action, will cause the disc-like flange 45 to engage one side of the aperture 41 in the rigid support arm 15 and thus catch or prevent the capillary pen support member from being disengaged from its position between the rigid support arm 15 and flexible support arm 16.

Any force on the capillary pen support member 13 and its associated capillary pen 14 in the direction of the rigid support arm 15 will not result in disengagement of the capillary pen support member from the rigid support arm 15 or the flexible support arm 16 as this force is against the rigid support arm 15 which is sufficiently rigid to prevent any deflection thereof.

It is extremely improbable that an axial force in the direction of the flexible support arm 16 will be encountered during the servicing of the marker assembly and especially during operation of the recorder since the frictional engagement of the capillary pen 14 with the chart paper will always produce a couple.

Thus, it will be appreciated that, by means of the present invention, the capillary pen support member can be easily and quickly inserted and removed from the marker assembly, while at the same time the capillary pen support member is protected against accidental dislodgment.

Referring again to FIG. 1, a main frame 20 is shown which serves as the supporting member for the paper supply roll 21, the paper take-up-roll 22 and drive roll 12 as well as drive motor 23 which drives the paper drive roll 12 at selected speeds through drive chain 24.

Maximum engagement or wrap around of the chart paper 11 on the drive roll 12 is effected by the use of a unique paper detour apparatus journaled on either side of the paper supply roll 21. Only one end of the paper detour apparatus is shown in FIG. 1 and will be described since there is correspondence in elements thereof on either end of the paper supply roll 21.

A side carrier member 25 journaled on the paper supply roll 21 provides the main supporting element for the paper detour apparatus. At the upper end of the side carrier member 25, there is secured a main support bar 26 on which is journaled a connecting member 27 which in turn supports a chart paper detour bar 30.

A main detour spring 31 urges the entire assembly forward against the chart paper 11 when the paper detour assembly is in the operating position as shown in FIG. 1.

A right angle abutment member 32 secured to the main frame 20 positions the chart paper detour bar 30 a predetermined distance from the chart paper 11.

A tortional spring 33 positioned on the main support bar 26 urges the connecting member 27 in a clockwise direction as seen in FIG. 1 to assure that the chart paper detour bar is maintained in place against the abutment member 32 while at the same time providing a resilient or spring action in the bar so that it may absorb any shock or uneveness in the travel of the paper past the bar.

When it is desired to replace the chart paper with a new roll of chart paper, the paper detour assembly may be easily swung or rotated out of engagement with the chart paper by merely seizing the detour release bar 47 with the thumbs and pressing downwardly and rearwardly thereon.

Once the paper detour assembly has been swung or rotated to the open position, a new roll of chart paper may be easily inserted into the recorder without the necessity of having to thread the paper under rods and through narrow passages. After the chart paper has been replaced, the paper detour system may be quickly returned to the closed position once again establishing maximum wrap around of the chart paper on the drive roll 12.

Having now described my invention, it is to be understood that the foregoing specific language was employed in describing the embodiments of the invention as selected for the purpose of illustration in the accompanying drawings and it should be further understood that no limitation of the scope of the invention is thereby intended, subject to various and further applications thereof being contemplated as would normally occur to those skilled in the art.

What is claimed is:

1. A marker assembly for a recorder comprising:
 a carrier member having two support arms, each including an aperture therein,
 a pen support member supported for rotation about its longitudinal axis between said two support arms by said apertures, and
 means on at least one end of said pen support member extending laterally from the longitudinal axis thereof and disposed in normally nonengaging relationship with said support arm, on the opposite side thereof, than said pen support member, during normal operation of the marker assembly but suitably dimensioned to engage the support arm to prevent accidental removal of the support member from between the two support arms upon the application of an undue force to the pen support member, tending to move the pen support member in a direction away from said means.

2. A marker assembly for a recorder comprising:
 a carrier member having two support arms, each including an aperture therein,
 an elongated pen support member supported for rotation about its longitudinal axis between said two support arms, at its either end, by said apertures, at least one end of which extends through the aperture in one of the support arms, and
 a flange extending laterally of the longitudinal axis of said pen support member, suitably proportioned to pass through the aperture of said one support arm but of greater dimension than said one end of said pen support member, affixed to said pen support member on the opposite side of said support arm than said pen support member and disposed in nonengaging relationship theerto during normal operation of said marker assembly, whereby the laterally extending flange will engage the support arm and secure the pen support member against disengagement therefrom upon the exertion of an undue force on the pen support member in a direction tending to move the pen support member away from the flange.

3. In a strip-chart recorder including a chart paper supply roll, a take-up roll, a drive roll and a marker assembly, the improvement in said marker assembly comprising:
 a carrier member having a rigid support arm with a first round aperture therein and a flexible support arm with a second round aperture therein,
 an elongated capillary pen support member having a frusto-conical bearing surface of a major diameter greater than said first round aperture disposed on one end thereof and journaled in said first round aperture in said rigid support arm and a conical end bearing surface of major diameter greater than said second round aperture disposed on the opposite end thereof and journaled in said second round aperture in said flexible support arm for rotatably supporting said elongated capillary pen support member between said rigid support arm and said flexible support arm, and
 a disc-like flange of diameter less than said first round aperture and greater than the minor diameter of said frusto-conical bearing surface and further having a common axis of symmetry therewith affixed to said frusto-conical bearing surface on the opposite side of said rigid support arm than said capillary pen support member whereby said disc-like element will engage said rigid support arm and secure said capillary pen support member against disengagement from said rigid support arm upon the exertion of a force on said capillary pen support member in other than an axial direction toward said flexible support arm.

4. A marker assembly for a recorder comprising:
 a carrier member having a rigid support arm with a first round aperture therein and a flexible support arm with a second round aperture therein,
 an elongated capillary pen support member having a frusto-conical bearing surface of a major diameter greater than said first round aperture disposed on one end thereof and journaled in said first round aperture in said rigid support arm and a conical end bearing surface of major diameter greater than said second round aperture disposed on the opposite end thereof and journaled in said second round aperture in said flexible support arm for rotatably supporting said elongated capillary pen support member between said rigid support arm and said flexible support arm, and
 a disc-like flange of diameter less than said first round aperture and greater than the minor diameter of said frusto-conical bearing surface and further having a common axis of symmetry therewith affixed to said frusto-conical bearing surface on the opposite side of said rigid support arm than said capillary pen support member whereby said disc-like element will engage said rigid support arm and secure said capillary pen support member against disengagement from said rigid support arm upon the exertion of a force on said capillary pen support member in other than an axial direction toward said flexible support arm.

(References on following page)

References Cited by the Examiner

UNITED STATES PATENTS

| | | | |
|---|---|---|---|
| 2,078,763 | 4/1937 | Hubbard | 346—139 |
| 2,732,276 | 1/1956 | Ridings et al. | 346—139 |
| 3,160,464 | 12/1964 | Suter et al. | 346—139 X |

FOREIGN PATENTS 219,019  5/1909  Germany.

OTHER REFERENCES

German printed application METRAWATT; 1,164,110, February 1964.

RICHARD B. WILKINSON, *Primary Examiner.*

JOSEPH W. HARTARY, *Assistant Examiner.*